(12) United States Patent
Wu et al.

(10) Patent No.: US 9,802,833 B2
(45) Date of Patent: Oct. 31, 2017

(54) SYNTHESIS OF METAL OXIDE-BASED THERMOELECTRIC MATERIALS FOR HIGH TEMPERATURE APPLICATIONS

(71) Applicant: PURDUE RESEARCH FOUNDATION, West Lafayette, IN (US)

(72) Inventors: Yue Wu, West Lafayette, IN (US); Gautam G. Yadav, West Lafayette, IN (US); Genqiang Zhang, Singapore (SG)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 88 days.

(21) Appl. No.: 14/861,788

(22) Filed: Sep. 22, 2015

(65) Prior Publication Data
US 2016/0023916 A1    Jan. 28, 2016

Related U.S. Application Data (62) Division of application No. 14/000,740, filed as application No. PCT/US2012/025872 on Feb. 21, 2012, now Pat. No. 9,169,128.

(60) Provisional application No. 61/445,178, filed on Feb. 22, 2011.

(51) Int. Cl.
| | |
|---|---|
| *C01G 23/00* | (2006.01) |
| *C01G 51/04* | (2006.01) |
| *C01G 51/00* | (2006.01) |
| *B82Y 30/00* | (2011.01) |
| *B82Y 40/00* | (2011.01) |

(52) U.S. Cl.
CPC ............ *C01G 23/006* (2013.01); *B82Y 30/00* (2013.01); *C01G 23/003* (2013.01); *C01G 23/005* (2013.01); *C01G 51/04* (2013.01); *C01G 51/40* (2013.01); *C01G 51/42* (2013.01); *C01G 51/66* (2013.01); *B82Y 40/00* (2013.01); *C01P 2002/72* (2013.01); *C01P 2004/04* (2013.01); *C01P 2004/16* (2013.01); *C01P 2006/32* (2013.01); *Y10S 977/762* (2013.01); *Y10S 977/896* (2013.01)

(58) Field of Classification Search
CPC .............. C01P 2004/16; Y10S 977/762; Y10S 977/896; B82Y 40/00
USPC ................... 423/598; 977/762, 896
See application file for complete search history.

(56) References Cited

U.S. PATENT DOCUMENTS

| | | | | |
|---|---|---|---|---|
| 3,328,117 | A * | 6/1967 | Emslie ................ | C01G 23/005 106/449 |
| 4,652,439 | A * | 3/1987 | Nishiuchi ............ | C01G 23/005 423/598 |
| 9,169,128 | B2 * | 10/2015 | Wu ....................... | C01G 23/006 |
| 2005/0036939 | A1 * | 2/2005 | Wong ................... | B82Y 10/00 423/598 |
| 2009/0302306 | A1 * | 12/2009 | Yun ...................... | B82Y 10/00 257/12 |

* cited by examiner

*Primary Examiner* — Steven Bos
(74) *Attorney, Agent, or Firm* — Purdue Research Foundation (57) ABSTRACT

Nanowire synthesis and one dimensional nanowire synthesis of titanates and cobaltates. Exemplary titanates and cobaltates that are fabricated and discussed include, without limitation, strontium titanate ($SrTiO_3$), barium titanate ($BaTiO_3$), lead titanate ($PbTiO_3$), calcium cobaltate ($Ca_3Co_4O_9$) and sodium cobaltate ($NaCo_2O_4$).

4 Claims, 14 Drawing Sheets

SYNTHESIS OF METAL OXIDE-BASED THERMOELECTRIC MATERIALS FOR HIGH TEMPERATURE APPLICATIONS

CROSS-REFERENCE TO RELATED APPLICATIONS

The present U.S. patent application is a divisional of U.S. patent application Ser. No. 14/000,740, filed Oct. 29, 2013, which is a U.S. National Stage Application of PCT/US2012/025872, filed Feb. 21, 2012, which claims the benefit of priority to U.S. provisional patent application 61/445,178, filed on Feb. 22, 2011, the disclosures of which are hereby incorporated by reference in their entirety.

INTRODUCTION TO THE INVENTION

The present disclosure is directed to nanowire synthesis and, more specifically, to one dimensional nanowire synthesis of titanates. Exemplary titanates that will be discussed include, without limitation, strontium titanate ($SrTiO_3$), barium titanate ($BaTiO_3$), lead titanate ($PbTiO_3$), calcium cobaltate ($Ca_3Co_4O_9$) and sodium cobaltate ($NaCo_2O_4$). In exemplary form, synthesis of each of the foregoing titanates follows the same generic method for the respective titanate synthesis precursors. The instant disclosure also discloses synthesis of calcium and sodium cobaltate. These cobaltates also follow an analogous generic procedure.

The titanate nanowires are fairly elongated with an average diameter of around 10 nm and fibrous in structure. The cobalt oxide ($Co_3O_4$) nanowires which are precursors in the synthesis of calcium and sodium cobalt oxide are free standing and have an average diameter of 530 nm.

The performance of a thermoelectric device is evaluated by a metric known as the figure of merit, (ZT). The figure of merit can be expressed as an equation:

$$ZT = S^2 \cdot \sigma \cdot T / \kappa$$

where:
S is the Seebeck coefficient,
$\sigma$ is the electrical conductivity of the thermoelectric material,
T is the temperature, and
$\kappa$ is the thermal conductivity.

Greater values of ZT indicate greater thermodynamic efficiency and better device performance. More specifically, figure of merit values of at least three are considered to be important in order for a thermoelectric device to be competitive with current mechanical generation and refrigeration methods.

One dimensional (1D) nanowire structure assist in the transfer of charge carriers and scattering of phonons which ultimately lead to an increase in electrical conductivity ($\sigma$) and decrease in thermal conductivity ($\kappa$) respectively. The electronic density of states undergoes a dramatic change and becomes sharper near the band edge for a 1D system, which results in a higher power factor for a given carrier concentration. This is the main reason behind tailoring the titanates and cobaltates into nanowire structures which in turn would increase ZT. Cobaltates are known to have high S and low thermal conductivity due to their strongly-correlated electronic structures and layered crystal structures.

DETAILED DESCRIPTION

The exemplary embodiments of the present disclosure are described and illustrated below to encompass nanowire synthesis and, more specifically, to one dimensional nanowire synthesis of titanates. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
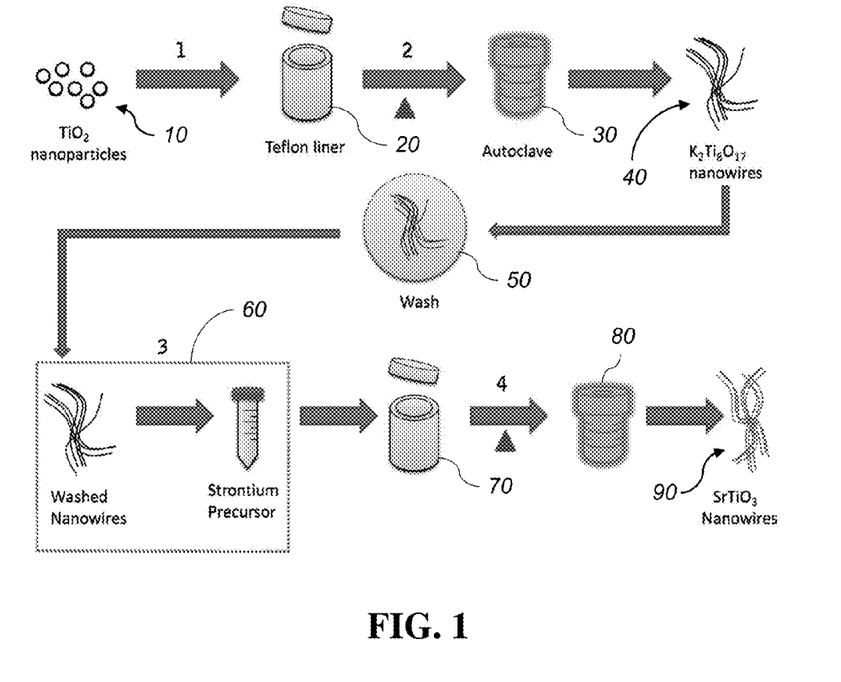
FIG. 1 is an exemplary process flow for forming strontium/barium/lead titanate nanowires in accordance with the instant disclosure.

Referencing FIG. 1, an exemplary process for synthesizing strontium titanate, barium titatate, and lead titanate includes a hydrothermal reaction. The exemplary synthesis process is carried out in two steps, the first of which involves production of potassium titanate nanowires prior to addition of a metal precursor that leads to formation of the respective titanates. Moreover, the reactions are carried out in the presence of potassium hydroxide solution with varying concentrations.

Figure 2:
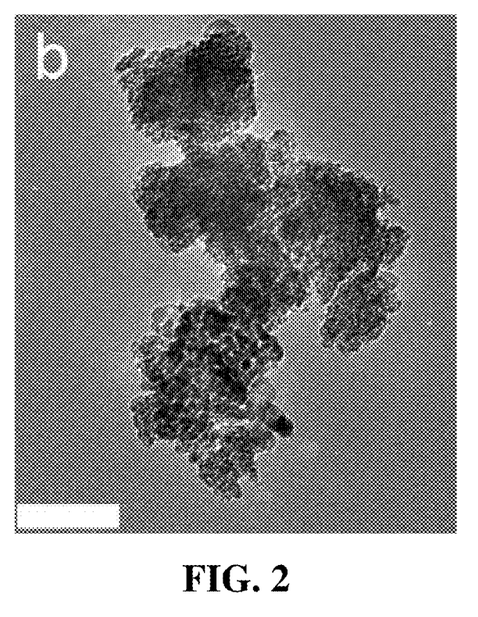
FIG. 2 is an image from a transmission electron microscope showing $TiO_2$ nanoparticles.
Figure 3:
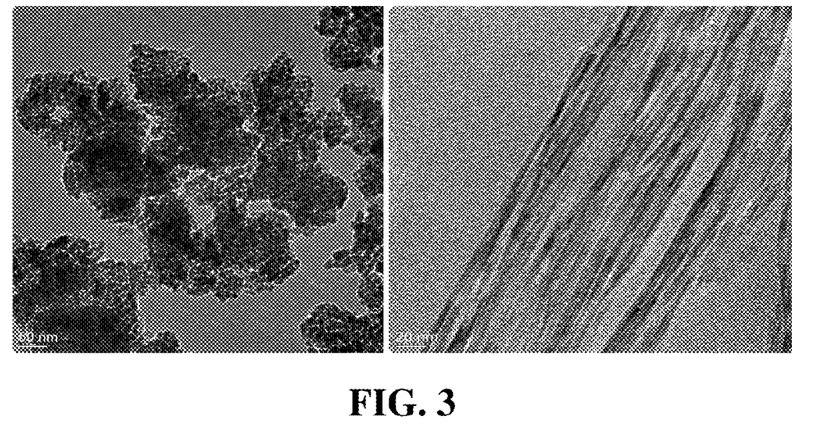
FIG. 3 are images from a transmission electron microscope showing the transformation of $TiO_2$ nanoparticles to $K_2Ti_8O_{17}$ nanowires.
Figure 4:
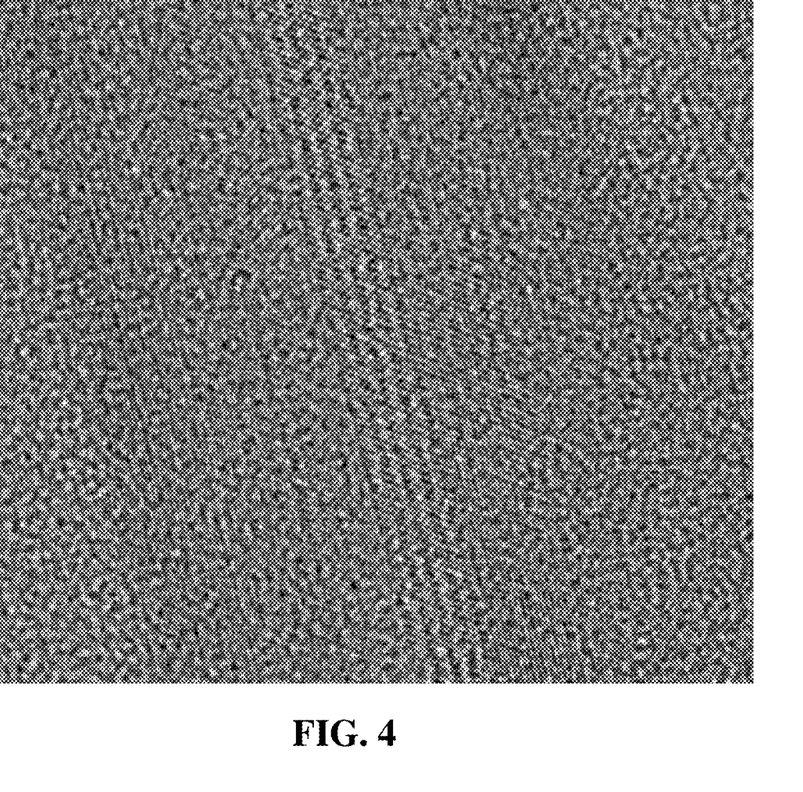
FIG. 4 is a high resolution image from a transmission electron microscope showing $K_2Ti_8O_{17}$ nanowires.
Figure 5:
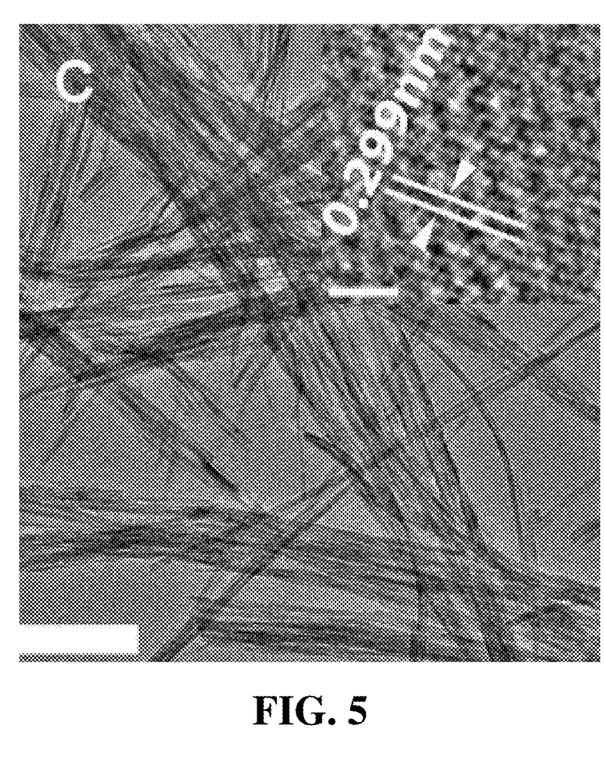
FIG. 5 is an image from a transmission electron microscope showing $K_2Ti_8O_{17}$ nanowires.

An exemplary process for forming potassium titanate nanowires includes using 0.08 g of commercially available titanium oxide ($TiO_2$) nanoparticles 10 less than 25 nanometers in size (see FIG. 2) that are added to a container (e.g., a glass vial) containing 6.8 g of potassium hydroxide (KOH) dissolved in 12 ml of deionized (DI) water. The mixture is then thoroughly mixed and later poured into a second container 20, in exemplary form, having a non-stick liner (e.g., a Teflon liner). The second container 20 is placed inside an autoclave 30 and heated at 200° C. at atmospheric pressure for at least two days (e.g., three days) to transform substantially all of the particles into nanowires 40. FIG. 3 shows images from a transmission electron microscope of titanium particles and of potassium titanate nanowires. FIGS. 4 and 5 show high resolution images from a transmission electron microscope of potassium titanate nanowires.

Referring back to FIG. 1, after the reaction has ended, the autoclave is allowed to cool down to room temperature and the contents from the second container are transferred to a third container (e.g., a plastic tube) where the contents are thoroughly washed 50 with DI water to remove any potassium salts present.

An exemplary process for forming the strontium/barium/lead titanates includes, depending upon the precursor desired, using: (i) 0.16 g of strontium nitrate; (ii) 0.131 g of barium nitrate; or (iii) 0.166 g of lead nitrate. The chosen nitrate is then mixed with a solution of 0.7 g of KOH dissolved in 10 ml of DI water in a container (e.g., a glass vial). The mixture is thoroughly mixed until the strontium/barium/lead nitrate is well dispersed in the solution. The solution is then added to well-washed potassium titanate nanowires and mixed 60 thoroughly before addition to a second container, in this circumstance having a non-stick liner (e.g., Teflon liner) 70. The second container and its contents are then placed in an autoclave 80 and heated at 200° C. for at least one day. After the reaction has ended, the autoclave is allowed to cool down to room temperature and the contents from the second container are transferred to a third container (e.g., a plastic tube) where the contents are thoroughly washed with DI water to remove any potassium salts present. The end product is the formation of the respective strontium/barium/lead titanate nanowires 90.

Figure 6:
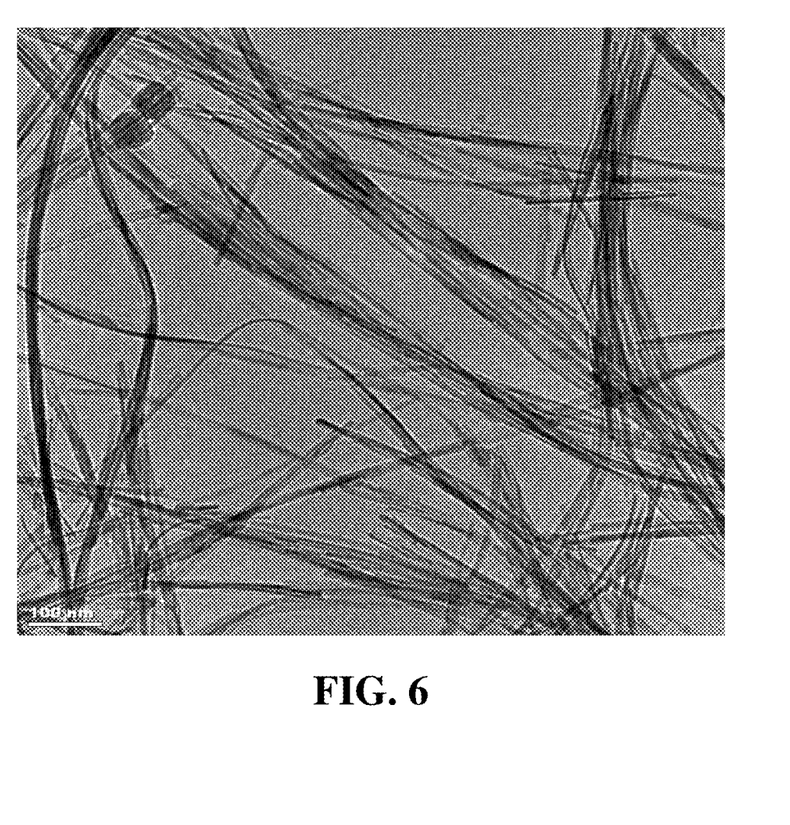
FIG. 6 is an image from a transmission electron microscope showing $SrTiO_3$ nanowires.
Figure 7:
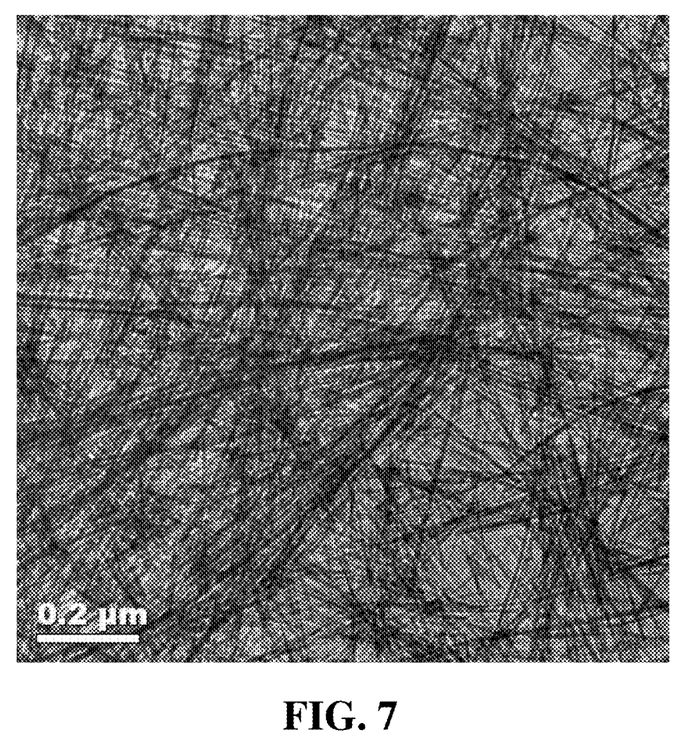
FIG. 7 is an image from a transmission electron microscope showing $BaTiO_3$ nanowires.
Figure 8:
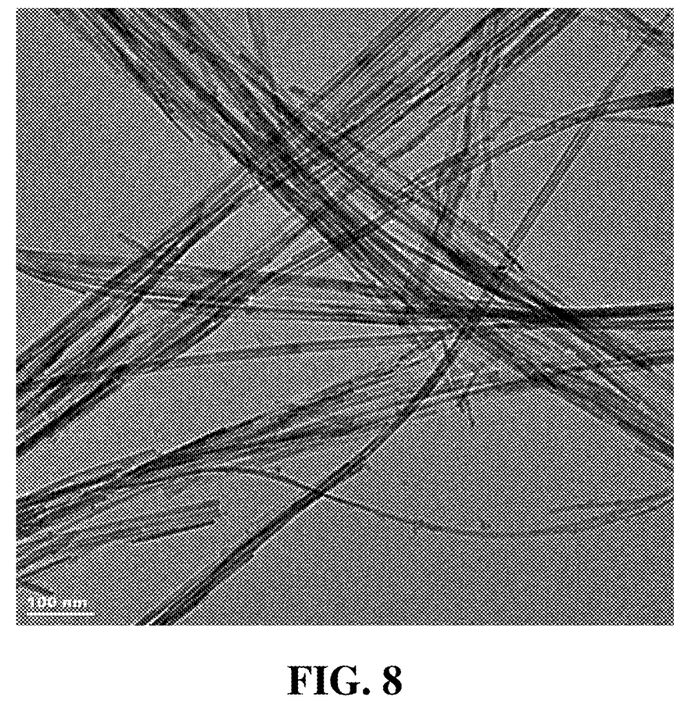
FIG. 8 is an image from a transmission electron microscope showing $PbTiO_3$ nanowires.

FIGS. 6-8 show images from a transmission electron microscope of strontium titanate nanowires, barium titanate nanowires, and lead titanate nanowires, respectively.

Figure 9:
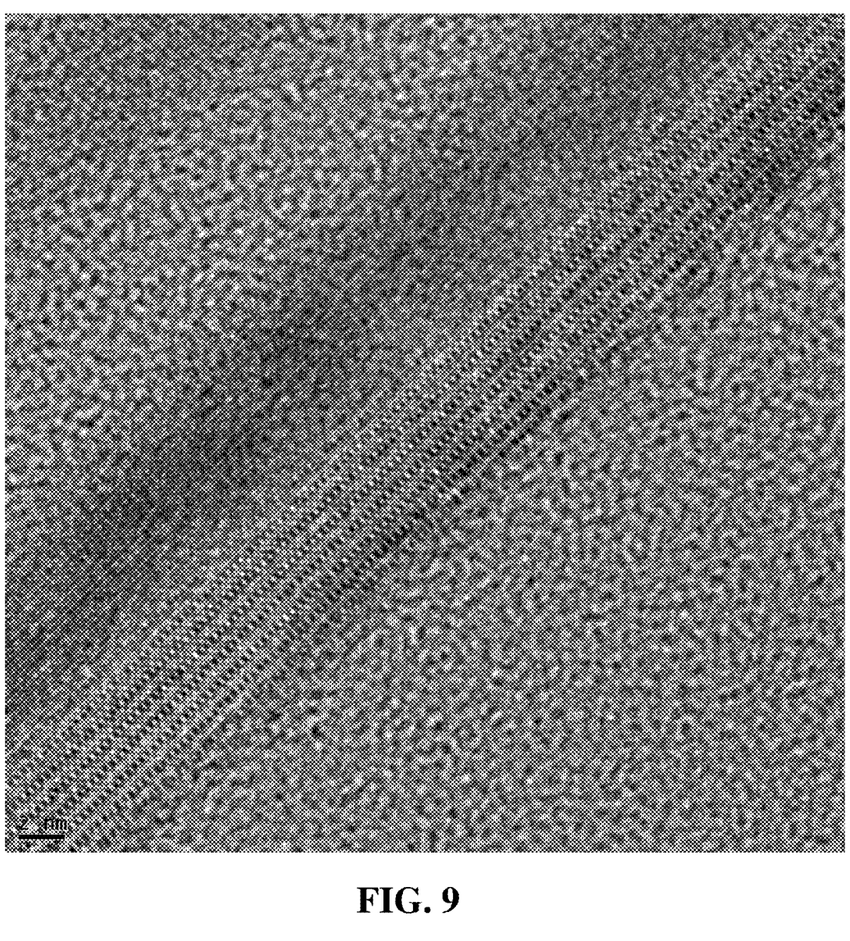
FIG. 9 is a high resolution image from a transmission electron microscope showing $SrTiO_3$ nanowires.
Figure 10:
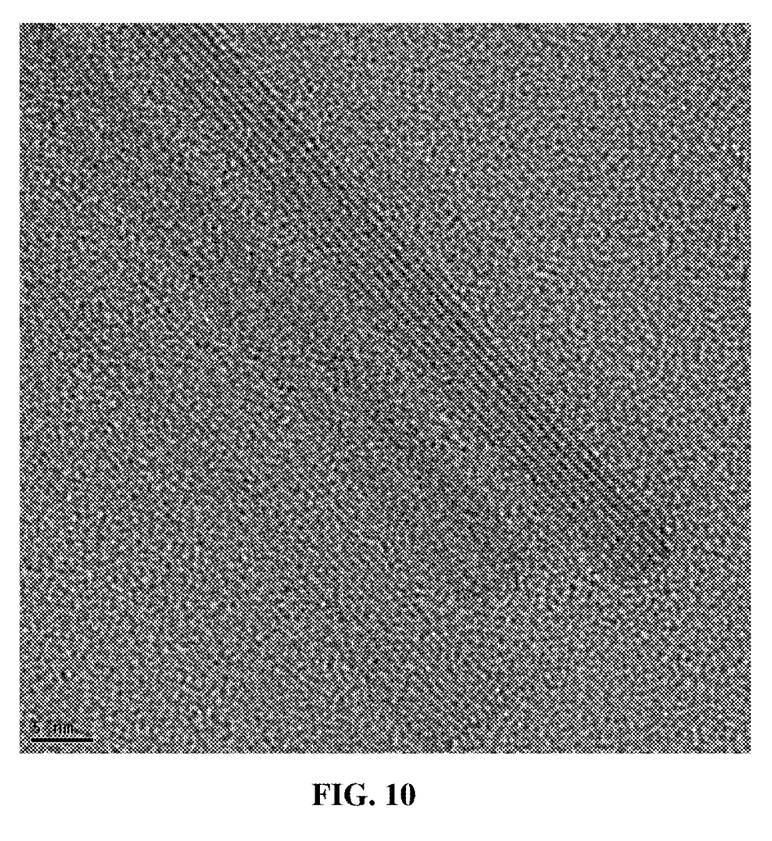
FIG. 10 is a high resolution image from a transmission electron microscope showing $BaTiO_3$ nanowires.
Figure 11:
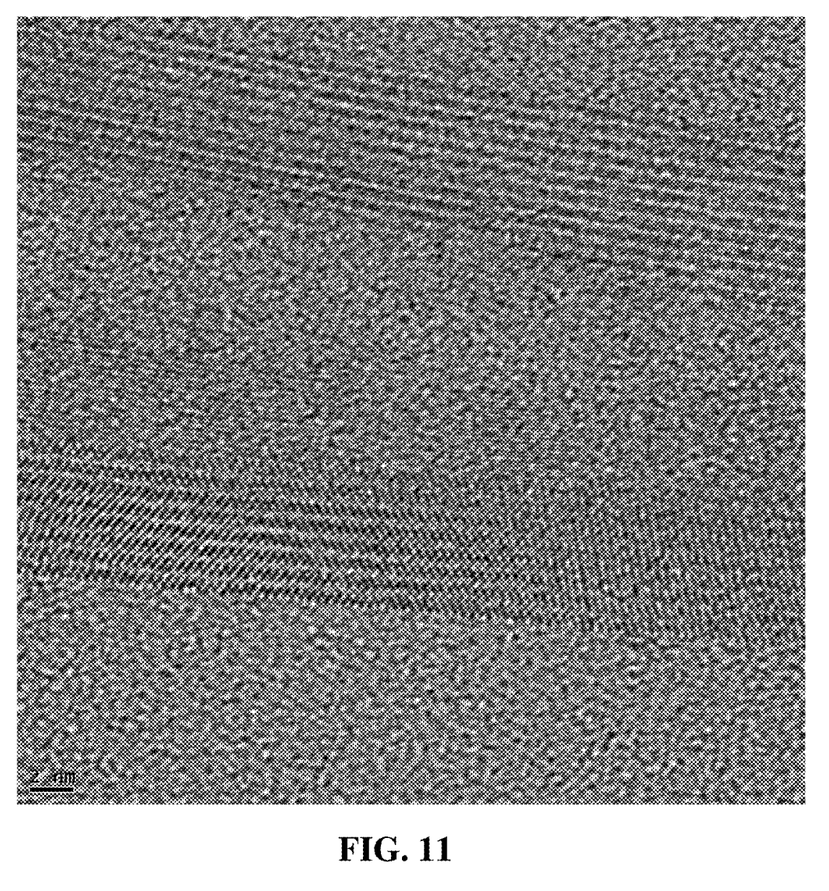
FIG. 11 is a high resolution image from a transmission electron microscope showing $PbTiO_3$ nanowires.

FIGS. 9-11 show high resolution images from a transmission electron microscope of strontium titanate nanowires, barium titanate nanowires, and lead titanate nanowires, respectively.

Figure 12:
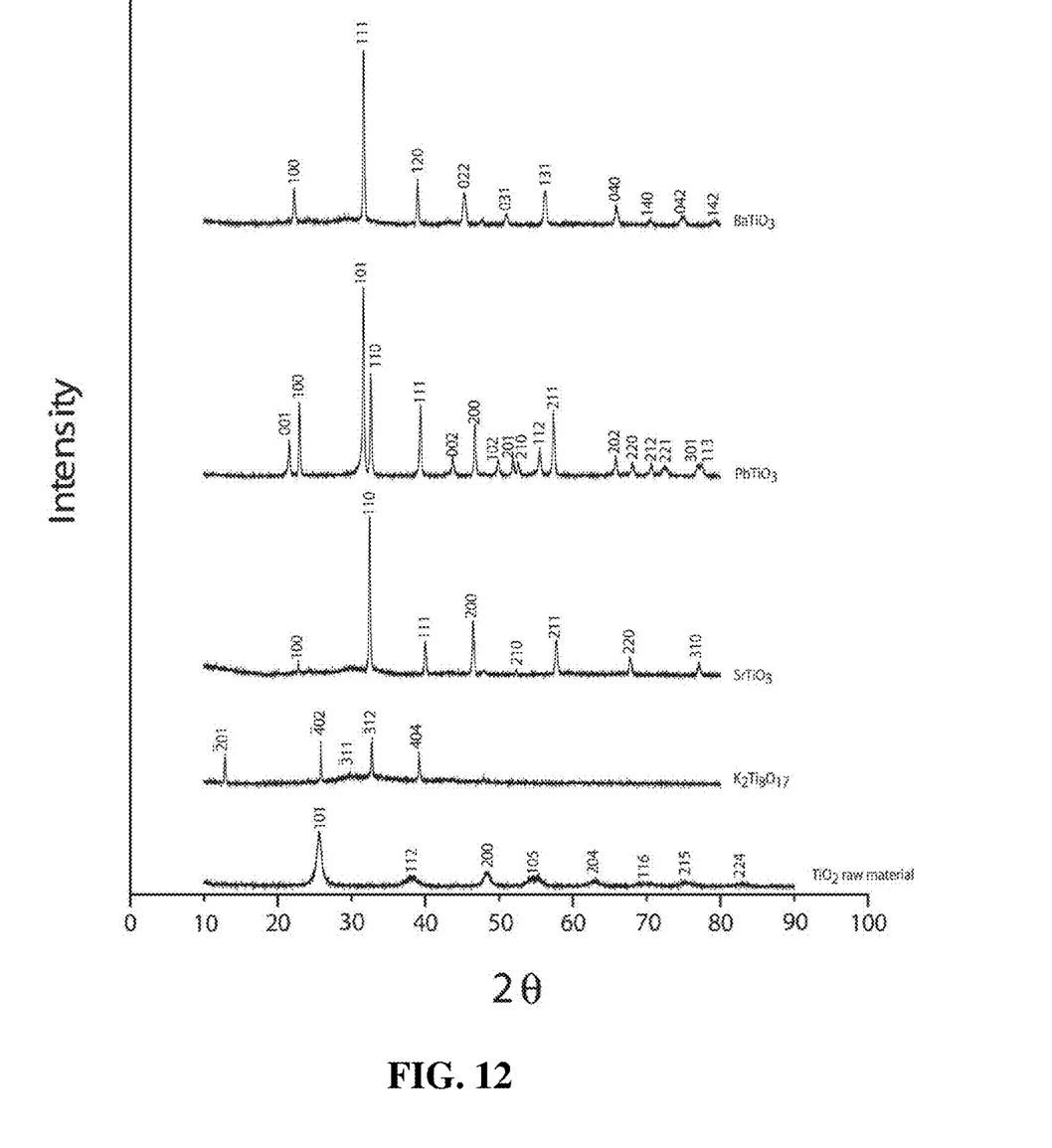
FIG. 12 is an X-ray diffraction of a titanium oxide raw material and potassium, strontium, lead and barium titanates fabricated in accordance with the instant disclosure.

FIG. 12 are X-ray diffraction plots of barium titanate, lead titanate, strontium titanate, potassium titanate, and titanium oxide.

Figure 13:
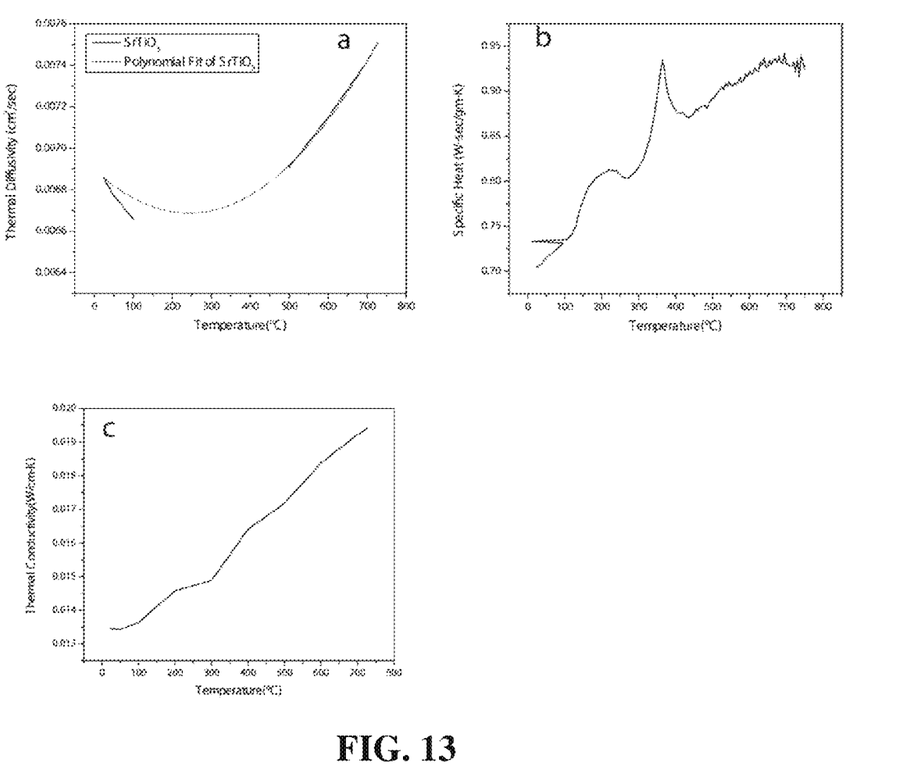
FIG. 13 are thermal diffusivity, specific heat, and thermal conductivity of $SrTiO_3$ as a function to temperature.

FIG. 13 are plots of thermal diffusivity, specific heat, and thermal conductivity of strontium titanate nanowires fabricated in accordance with the instant disclosure, as a function of temperature.

An exemplary process for synthesizing calcium cobaltate and sodium cobaltate includes a hydrothermal synthesis carried out in two steps. The first step includes the formation of cobalt oxide ($Co_3O_4$) nanowires. The second step involves forming the calcium and sodium precursors that are ultimately used to form the respective cobaltates.

An exemplary process for forming cobalt oxide ($Co_3O_4$) nanowires includes growing $Co_3O_4$ nanowires on a substrate (e.g., glass). The substrate, in this case glass, is cut into several pieces and kept inside a sealed container (e.g., Petri dish) before the reaction. To obtain the reaction, 10 mmols of cobalt nitrate hexahydrate is first dissolved in 10 ml of DI water and stirred for approximately two minutes. 40 ml of 27 wt % of ammonia is then added to the dissolved mixture and then stirred for approximately thirty minutes. Afterwards, sealed container is heated at 90° C. for approximately fourteen hours. During this time, the container remains sealed to prevent any ammonia from escaping during the reaction.

After the reaction has been completed, the glass pieces are recovered from the sealed container and washed in DI water. The washed glass pieces reveal a dark surface that is indicative of nanostructure growth. The glass pieces are then dried at room temperature, after which the glass pieces are heated inside a tube furnace at 250° C. using a thermal progression rate of 60° C./hour for approximately four hours. Thereafter, the nanowires are removed from the glass pieces.

Figure 14:
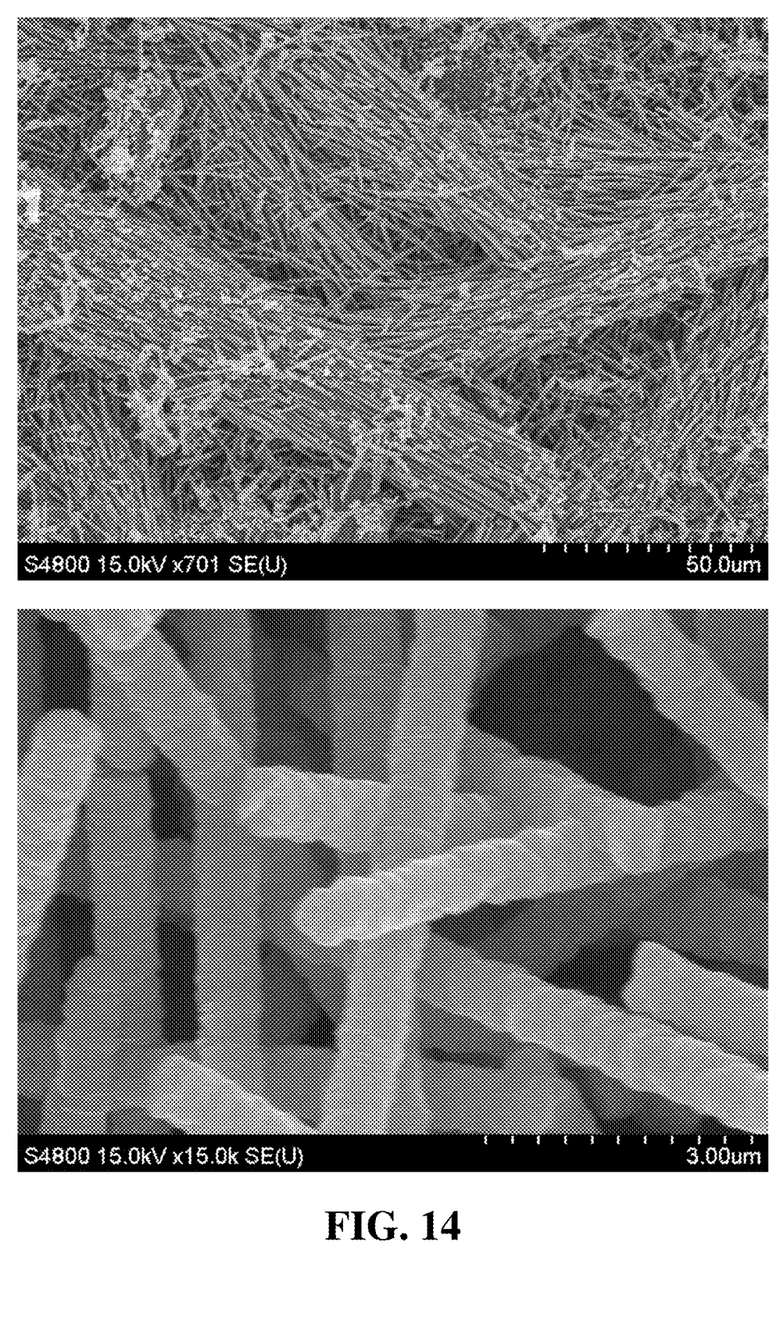
FIG. 14 includes an image and a high resolution image from a scanning electron microscope of $Co_3O_4$ nanowires grown on a glass substrate.

FIG. 14 shows images from a scanning electron microscope of cobalt oxide nanowires grown on the glass substrate.

Figure 15:
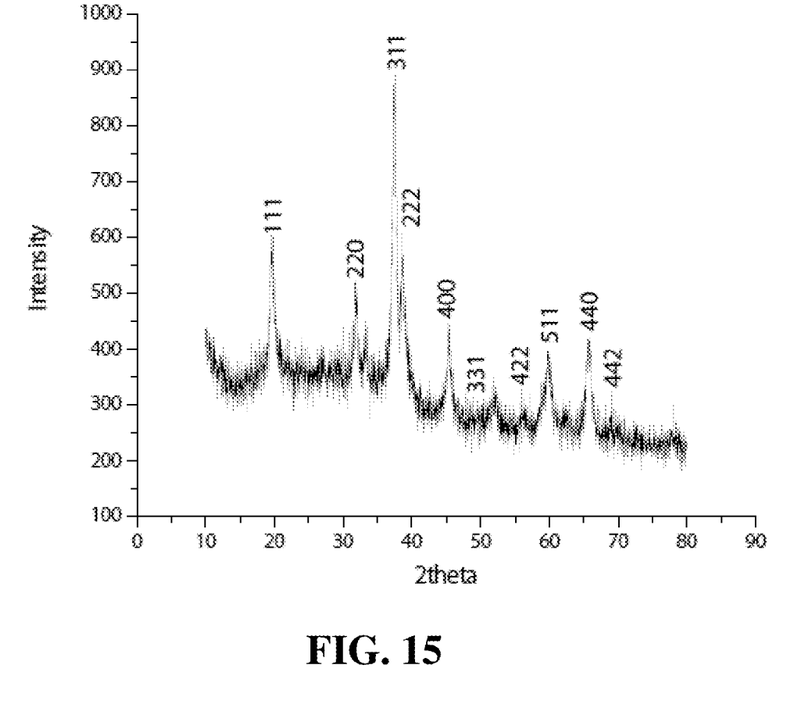
FIG. 15 is an X-ray diffraction of $Co_3O_4$ on a glass substrate.

FIG. 15 is an X-ray diffraction plot of the cobalt oxide nanowires grown on the glass substrate.

An exemplary process for forming the calcium/sodium cobaltates includes, depending upon the precursor desired, using: (i) 0.16 g of calcium nitrate; or (ii) 0.16 g of sodium nitrate, which is mixed with a solution of 0.7 g of KOH dissolved in 10 ml of DI water in a container (e.g., a glass vial). The mixture is thoroughly mixed until the calcium/sodium nitrate is well dispersed in the solution. The solution is then added to well-washed cobalt oxide nanowires and mixed thoroughly before addition to a second container, in this circumstance having a non-stick liner (e.g., Teflon liner). The second container and its contents are then placed in an autoclave and heated at 200° C. for at least one day. After the reaction has ended, the autoclave is allowed to cool down to room temperature and the contents from the second container are transferred to a third container (e.g., a plastic tube) where the contents are thoroughly washed with DI water. The end product is the formation of the respective calcium/sodium cobaltates.

The syntheses of the respective titanates and cobaltates ultimately produce thermoelectric materials that may be used for high temperature applications. Since these thermoelectric materials are oxide based materials, the materials are able to withstand high temperatures and have high efficiencies at high and very high temperatures.

Following from the above description and disclosure summaries, it should be apparent to those of ordinary skill in the art that, while the methods and apparatuses herein described constitute exemplary embodiments of the present disclosure, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the disclosure in order to fall within the scope of any claims, since the invention is defined by the claims and since inherent and/or unforeseen advantages of the present invention may exist even though they may not have been explicitly discussed herein.

What is claimed is:

1. A process for forming nanowires, the process comprising:
   combining potassium titanate nanowires with a solution comprising KOH mixed with strontium nitrate, barium nitrate, or lead nitrate to create a combination; and
   processing the combination by heating the combination at a temperature above 200° C. for at least one day to form an end product.

2. The method of claim 1, wherein the processing further comprises:

washing the end product after the heating step by rinsing the end product with deionized water.

3. The method of claim 2, wherein processing the combination further comprises separating the end product from solution.

4. The method of claim 1, wherein the potassium titanate nanowires are formed by mixing nanoparticles containing titanium oxide with a solution containing KOH to create a precursor mixture; and heating the mixture.

* * * * *